June 24, 1930.  L. J. FISHER  1,766,816
AIR HEATING SYSTEM
Filed Dec. 14, 1928  2 Sheets-Sheet 1
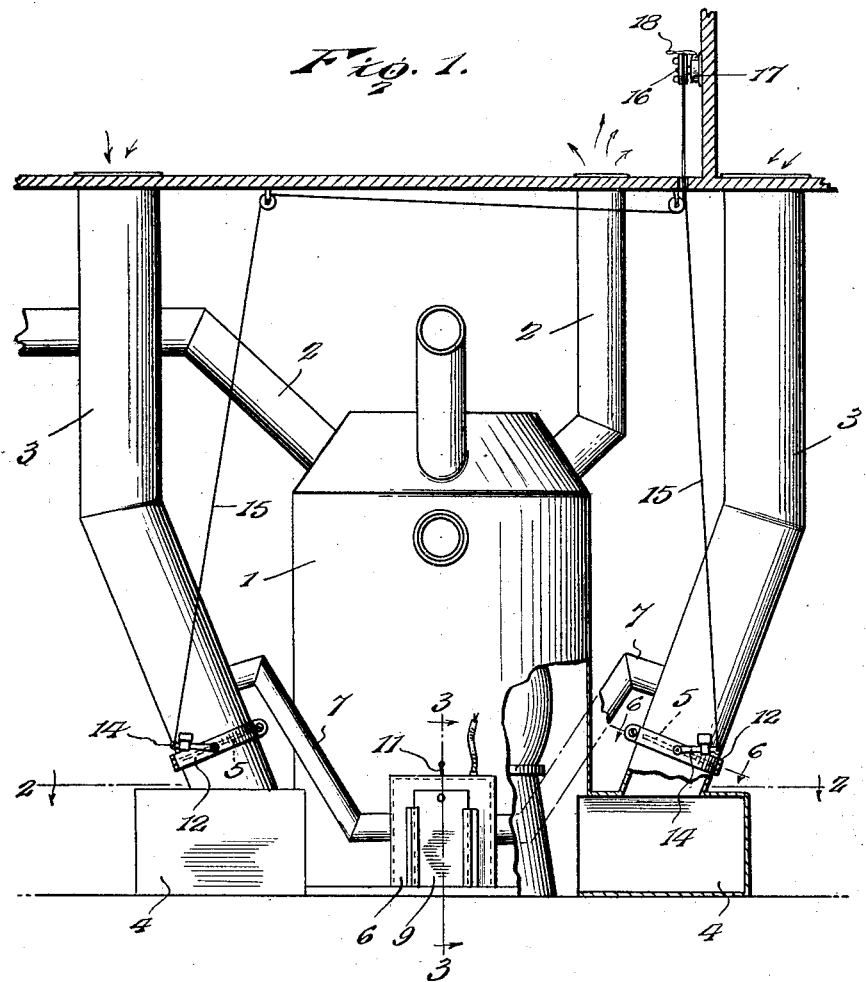
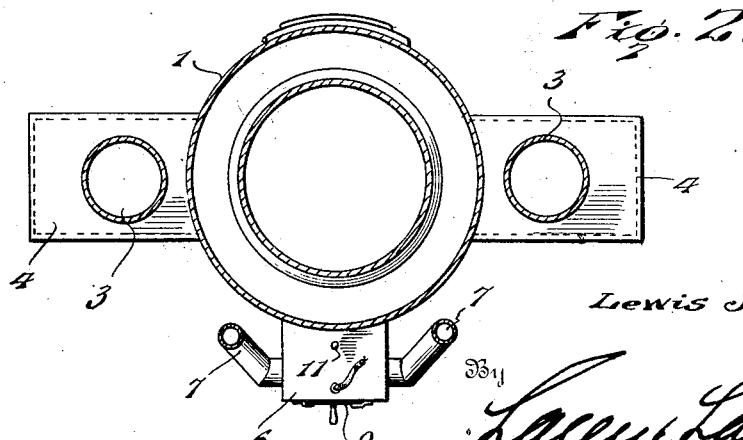
Inventor
Lewis J. Fisher.
By Lacey & Lacey, Attorneys June 24, 1930. L. J. FISHER 1,766,816
AIR HEATING SYSTEM
Filed Dec. 14, 1928 2 Sheets-Sheet 2
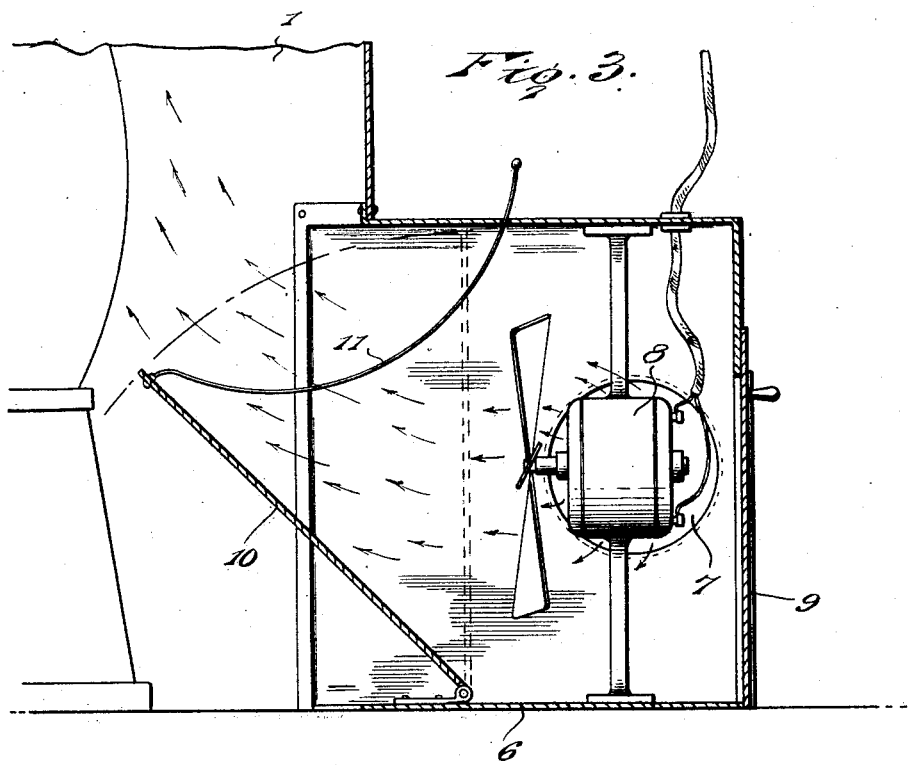
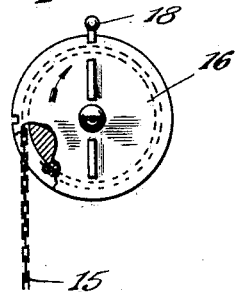
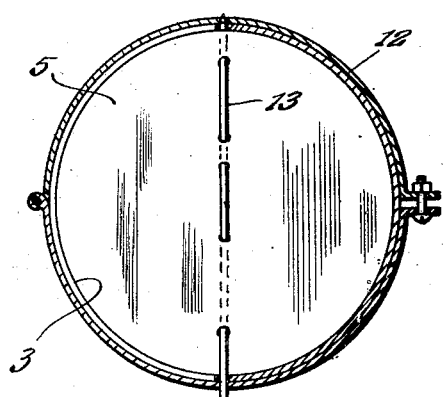
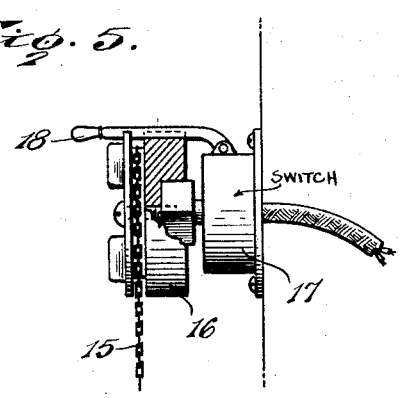
Inventor
Lewis J. Fisher.
By Lacey & Lacey, Attorneys Patented June 24, 1930

1,766,816

UNITED STATES PATENT OFFICE

LEWIS J. FISHER, OF REEDSBURG, WISCONSIN

AIR-HEATING SYSTEM

Application filed December 14, 1928. Serial No. 325,999.

The invention relates to hot air heating and provides for a forced circulation of the air when rapid heating is required.

In the accustomed way of heating the hot air from the hot air chamber of the furnace passes off through pipes to the different rooms to be heated and cold air is drawn into the hot air chamber in a cycle of operation.

The present invention provides for accelerating the flow of circulation of air through the hot air chamber of the furnace, whereby the rooms, or other places to be heated, may be warmed more rapidly than is possible by the system in vogue.

The invention contemplates an electric fan and a damper controlled air supply, said fan drawing in the air and forcing it through the hot air chamber of the furnace. A single control operates the damper and the switch of the fan circuit in consonance, both in the opening and the closing.

While the drawings illustrate a preferred embodiment of the invention, it is to be understood that in adapting the means to meet specific needs and requirements, the design may be varied and such other changes in the minor details of construction may be resorted to within the scope of the invention, as claimed, without departing from the spirit thereof.

For a full understanding of the invention and the merits thereof, reference is to be had to the following description and the drawings hereto attached, in which:—

Figure 1 is an elevational view of a hot air heating system embodying the invention.

Figure 2 is a horizontal sectional view on the line 2—2 of Figure 1.

Figure 3 is an enlarged detail sectional view on the line 3—3 of Figure 1.

Figure 4 is a front view of the damper and switch control.

Figure 5 is a side view of the part illustrated in Figure 4, partly in section.

Figure 6 is an enlarged detail sectional view on the line 6—6 of Figure 1.

Corresponding and like parts are referred to in the following description and designated in the several views of the drawings by like reference characters.

The numeral 1 denotes a hot air furnace of any type or make and 2 designates the hot air pipes leading the warm air from the furnace to the rooms and places to be heated.

The numeral 3 designates cold air pipes which are connected with boxes 4 in communication with the hot air chamber of the furnace at opposite points. The pipes 3 supply the air to the furnace to be heated. A damper 5 is located in each of the pipes 3 adjacent the boxes 4 and when in closed position cuts off the supply of air to the boxes 4. The pipes 3 are shown as connecting with the floor above that containing the furnace, thereby drawing the supply of air from the house or other structure to be heated. Obviously the cold air may be drawn from any point as commonly practiced in hot air heating systems.

A box 6 is connected to the hot air chamber of the furnace 1 midway between the boxes 4, and pipes 7 connect opposite sides of the box 6 with the air supplying pipes 3 at a point above the dampers 5. An electric fan 8 is located within the box 6 to create a positive circulation of air therethrough and through the hot air chamber of the furnace when rapid heating is required. Access to the box 6 is had through an opening formed in a side thereof and which opening is normally closed by means of a door 9 slidable in ways provided at opposite sides of the opening. A damper 10 within the box 6 controls discharge of the air therefrom. The damper 10 is hinged at its lower end to the bottom of the box 6 and is free to swing at its upper end and is adapted to be controlled by means of a rod 11, which is connected to the damper 10 and passes through an opening formed in the top of the box 6.

For rapid heating the dampers 5 are closed and the fan 8 set in action. This draws air into the box 6 through the pipes 3 and 7 and forces the air through the hot air chamber of the furnace and through the distributing pipes 2. This enables the heating to be effected more rapidly than would be the case if the air were circulated in the ordinary way by being drawn through the pipes 3 and boxes 4 and discharged from the hot air chamber of the furnace in the accustomed manner. When the heating has been effected the dampers 5 are opened and the fan 8 stopped thereby permitting the air to circulate in the usual way.

When applying the invention to a heating system already installed an opening is formed in a side of each of the cold air pipes 3 and the dampers 5 are positioned within said pipes by being introduced through the openings. A clamp band 12 is fitted about each of the pipes 3 and closes the opening formed in a side thereof and also receives the ends of the pin or shaft 13 upon which the damper 5 is mounted.

An arm 14 is provided at one end of each shaft 13. A connection 15 such as a chain is attached to each of the arms 14 and is connected to a suitable control to admit of both dampers 5 being operated synchronously. For convenience the arms 14 are weighted to normally hold the dampers 5 in open position. The control for the dampers 5 consists of a grooved pulley 16 which may be located at any convenient point for operation. The numeral 17 indicates an electric switch which is associated with the control 16 to operate simultaneously therewith. As a result the circuit supplying current to the motor of the fan 8 is closed simultaneously with the closing of the dampers 5, with the result that air is positively drawn into the pipes 3 and 7 and forced through the hot air chamber of the furnace 1 and the distributing pipe 2. A latch 18 is provided to hold the control 16 in either one of its extreme positions, that is with the dampers 5 open or closed. Under normal conditions the dampers 5 are open, and the switch 17 breaks the circuit of the fan motor. For rapid heating the control 16 is operated thereby closing the dampers 5 and the circuit to the motor of the fan.

The dampers 5 prevent the fan 8 from throwing the heated air from the hot air chamber back into the cold air pipes 3 and insure a forced discharge of the air from the hot air chamber through the distributing pipes 2.

Having thus described the invention, I claim:—

1. In a hot air heating system including a furnace having a hot air chamber, a cold air pipe connected with the hot air chamber for supplying air thereto, a damper in the cold air pipe, a forced air supply connected with the hot air chamber including an electrically operated fan, and manually operable means for simultaneously closing the damper in the cold air pipe to prevent back flow through said pipe and for closing the circuit through the motor to supply air under pressure to the hot air chamber for accelerating the action of the heating system.

2. In a hot air heating system including a furnace having a hot air chamber, a cold air pipe connected with the hot air chamber for supplying air thereto, a damper in the cold air pipe, a forced air supply connected with the hot air chamber including an electrically operated fan, manually operable means for simultaneously closing the damper in the cold air pipe to prevent back flow through said pipe and for closing the circuit through the motor to supply air under pressure to the hot air chamber for accelerating the action of the heating system, and a damper in the path of the forced air supply to direct its entrance into the hot air chamber.

3. In a hot air heating system, including a furnace having a hot air chamber, a cold air pipe connected with the hot air chamber for supplying air thereto, a damper in the lower portion of the cold air pipe adjacent its connection with the hot air chamber, a forced air supply connected with the cold air pipe at a point beyond the damper therein and with the hot air chamber and including an electrically operated fan, and manually operable means for simultaneously closing the circuit through the motor and closing the damper in the cold air pipe to prevent back flow through said pipe when a forced air supply is passing through the hot air chamber.

4. In a hot air heating system including a furnace having a hot air chamber, cold air pipes connected with the hot air chamber, a damper in each of the cold air pipes, a box connected with the hot air chamber intermediate the points of connection of the cold air pipes therewith, auxiliary pipes between the said box and cold air pipes and connected to the latter at a point above the dampers therein, an electric fan in the box for creating a forced current through the hot air chamber, manually operable means for simultaneously closing the dampers in the cold air pipes and the circuit through the motor to prevent back flow through the cold air pipes when the fan is forcing air through the hot air chamber, and a damper for controlling the direction of forced air entering the said air chamber.

In testimony whereof I affix my signature.

LEWIS J. FISHER. [l. s.]